(12) United States Patent
Lee (10) Patent No.: US 8,769,779 B2
(45) Date of Patent: Jul. 8, 2014

(54) INERTIA LOCKING HIDDEN PUSHPIN

(75) Inventor: Yun Shin Lee, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 177 days.

(21) Appl. No.: 13/070,968

(22) Filed: Mar. 24, 2011

(65) Prior Publication Data

US 2012/0240362 A1 Sep. 27, 2012

(51) Int. Cl.
*F16B 5/00* (2006.01)
*B60R 13/02* (2006.01)
*F16B 19/10* (2006.01)
*F16B 5/06* (2006.01)

(52) U.S. Cl.
CPC ............ *F16B 5/065* (2013.01); *B60R 13/0206* (2013.01); *F16B 19/109* (2013.01)
USPC .................................. 24/292; 24/453; 24/458

(58) Field of Classification Search
USPC ............. 24/458, 581.11, 291, 292, 297, 453, 24/289, 607, 608; 403/325, 326, 327, 403/322.1, 322.4; 411/347, 45, 552, 549, 411/349; 361/704, 702, 718, 712, 719; 165/185, 80.3; 280/728.3; 257/718, 257/719, 727; 292/253, 300; 296/1.08, 296/187.03
See application file for complete search history.

(56) References Cited

U.S. PATENT DOCUMENTS

| | | | |
|---|---|---|---|
| 3,240,520 A * | 3/1966 | Dailey et al. .................... 403/325 |
| 3,669,481 A * | 6/1972 | Bergmann ...................... 292/49 |
| 4,637,914 A * | 1/1987 | Boyle et al. .................... 376/353 |
| 4,716,633 A * | 1/1988 | Rizo ................................ 24/453 |
| 4,861,208 A | 8/1989 | Boundy |
| 5,100,272 A * | 3/1992 | Jadoul et al. .................... 411/45 |
| 5,207,544 A * | 5/1993 | Yamamoto et al. ........... 411/348 |
| 5,301,396 A | 4/1994 | Benoit |
| 5,419,606 A | 5/1995 | Hull et al. |
| 5,507,610 A | 4/1996 | Benedetti et al. |
| 5,624,130 A * | 4/1997 | Ricks .......................... 280/728.2 |
| 5,850,676 A * | 12/1998 | Takahashi et al. .............. 24/297 |
| 5,934,729 A | 8/1999 | Baack |
| RE36,351 E * | 10/1999 | Yamamoto et al. ........ 280/728.2 |
| 5,975,820 A | 11/1999 | Kirchen |
| 6,077,011 A * | 6/2000 | Walker .......................... 411/348 |
| 6,431,585 B1 * | 8/2002 | Rickabus et al. ........... 280/728.3 |
| 6,560,819 B2 * | 5/2003 | Mizuno et al. .................. 16/2.2 |
| 7,033,121 B2 * | 4/2006 | Kirchen .......................... 411/48 |
| 7,116,556 B2 * | 10/2006 | Lee et al. ....................... 361/704 |
| 7,126,823 B2 * | 10/2006 | Chen et al. .................... 361/702 |
| 7,178,855 B2 | 2/2007 | Catron et al. |
| 7,186,068 B2 * | 3/2007 | Zoubek et al. ................ 411/510 |
| 7,188,393 B2 * | 3/2007 | Kawai ............................. 24/297 |
| 7,208,853 B2 * | 4/2007 | Terrill et al. .................... 310/51 |
| 7,246,828 B2 * | 7/2007 | Kitzis ........................... 292/253 |
| 7,281,303 B2 * | 10/2007 | Terrill et al. .................... 24/453 |
| 7,367,249 B1 * | 5/2008 | Chiang ....................... 81/177.85 |
| 7,549,199 B2 * | 6/2009 | Bugner ............................ 24/297 |
| 7,966,702 B2 * | 6/2011 | Horimatsu et al. ............. 24/297 |
| 2002/0026693 A1 * | 3/2002 | Akema et al. ................... 24/453 |
| 2006/0042053 A1 * | 3/2006 | Kawai ............................. 24/297 |

* cited by examiner

*Primary Examiner* — Robert J Sandy
*Assistant Examiner* — Abigail Morrell
(74) *Attorney, Agent, or Firm* — Vichit Chea; Price Heneveld LLP (57) ABSTRACT

A pin assembly for retaining a trim panel to an inner panel is provided that comprises a hollow pushpin having a fin on a surface of the pushpin, wherein the fin is configured to flex into a void. The pin assembly further includes a first spring located proximate a first end of the pushpin, a second spring located proximate a second end of the pushpin, and an inertia pin disposed substantially within the pushpin.

20 Claims, 7 Drawing Sheets

INERTIA LOCKING HIDDEN PUSHPIN

FIELD OF THE INVENTION

The present invention generally relates to a trim panel attachment assembly, and more particularly relates to an inertia locking hidden pushpin.

BACKGROUND OF THE PRESENT INVENTION

Automotive vehicles typically include decorative trim panel pieces secured to inner panels in a variety of ways. Such trim panels must meet installation and removal standards for service, while also meeting standards pertaining to retention in the event of an impact. Often, screws or other mechanical fasteners are employed to secure the trim panel to the inner panel, however, visible screws or fasteners are not desirable from an aesthetics standpoint. Other trim panels are secured to the inner panel by hidden fasteners, however, these do not ensure retention forces sufficient to completely retain the trim panel in the event of an impact.

Accordingly, an apparatus is desired having the aforementioned advantages and solving and/or making improvements on the aforementioned disadvantages.

SUMMARY OF THE PRESENT INVENTION

In a first disclosed embodiment, a pin assembly for retaining a trim panel to an inner panel is provided that comprises a hollow pushpin having a fin on a surface of the pushpin, wherein the fin is configured to flex into a void. The pin assembly further includes a first spring located proximate a first end of the pushpin, a second spring located proximate a second end of the pushpin, and an inertia pin disposed substantially within the pushpin.

In another disclosed embodiment, a pin assembly for retaining an automotive trim panel to an inner panel is provided that comprises a hollow pushpin comprising a front end, a rear end, and a plurality of flexible fins in spaced arrangement around the outer perimeter of the hollow pushpin, wherein each of the plurality of flexible fins is configured to flex into a corresponding void. The pin assembly also includes an inertia pin disposed within the hollow pushpin that includes a first end that is insertable into an aperture of the inner panel, wherein the first end is tapered to facilitate insertion into the aperture, a second end that is operably connected to the automotive trim panel, a shaft portion proximate the second end, a plunger portion proximate the first end, and a neck section between the shaft portion and the plunger portion. The pin assembly further includes a front spring disposed substantially between the first end of the inertia pin and the front end of the hollow pushpin and a rear spring disposed between a weight and the rear end of the hollow pushpin.

In another disclosed embodiment, a pin assembly for retaining a trim panel to an inner panel is provided that includes a circular pushpin having a hollow inner portion, wherein the circular pushpin includes at least one flexible member that comprises an angled face that is configured to flex into a void upon removal of the trim panel from the inner panel. The pin assembly also includes an inertia pin slidably disposed within the inner portion of the circular pushpin, wherein the inertia pin comprises a plunger portion at the first end that substantially fills the hollow inner portion of the circular pushpin, a shaft portion at the second end that substantially fills the hollow inner portion of the circular pushpin, and a neck portion between the plunger portion and the shaft portion, and wherein the neck portion is aligned with the at least one flexible member when the inertia pin is in a static position.

These and other aspects, objects, and features of the present invention will be understood and appreciated by those skilled in the art upon studying the following specification, claims, and appended drawings.

DETAILED DESCRIPTION OF EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

The reference numeral 10 (FIGS. 1-3) generally designates a pin assembly for retaining a trim panel 12 to an inner panel 26, such as a door panel. In the illustrated example, the pin assembly 10 comprises a hollow pushpin 14 having a fin 20 on a surface of the pushpin 14, where the fin 20 is configured to flex into a void 22 in the pushpin 14. The pin assembly 10 also comprises a first spring 40 located proximate a first end 16 of the pushpin 14. The pin assembly 10 further includes a second spring 42 located proximate a second end 18 of the pushpin 14. The pin assembly 10 also comprises an inertia pin 24 disposed substantially within the pushpin 14.

Figure 1:
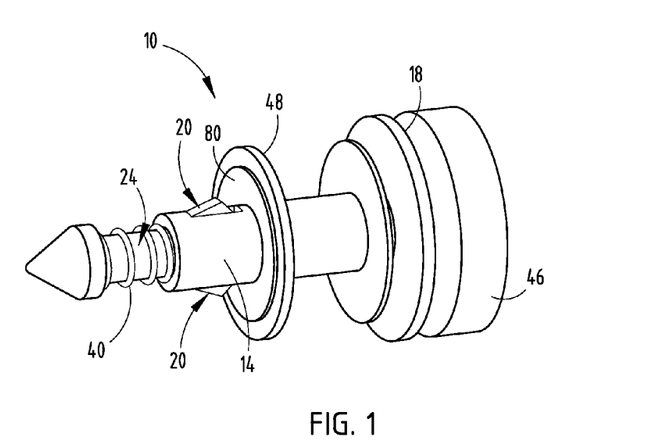
FIG. 1 is a front perspective view of a pin assembly for retaining a trim panel to an inner panel.
Figure 2:
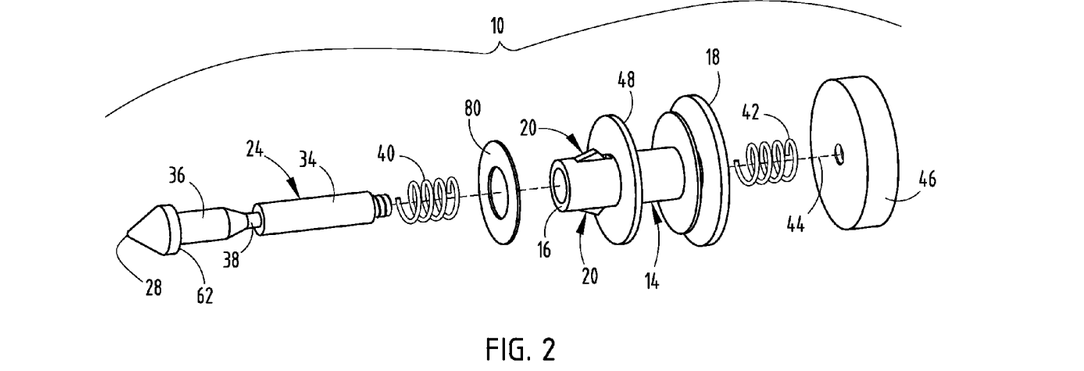
FIG. 2 is a front, exploded perspective view of the pin assembly.
Figure 3:
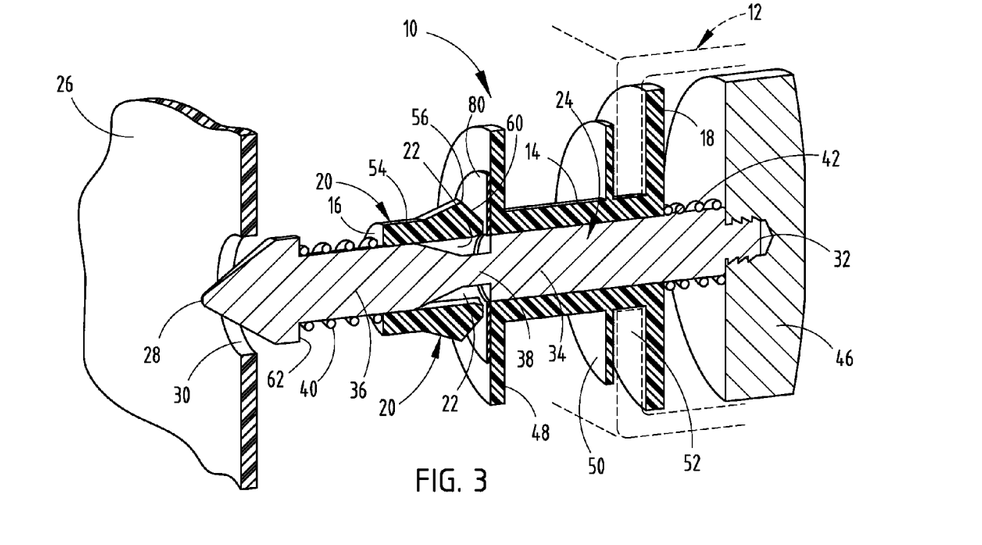
FIG. 3 is a front, perspective cross-sectional view of the pin assembly prior to insertion into an aperture of the inner panel.

In the illustrated example, the hollow pushpin 14 has a cylindrical geometry with a cylindrical hollowed out portion. The hollow pushpin 14 includes a front end 16 and a rear end 18. At or near the rear end 18 of the hollow pushpin 14, two cylindrical disks 50, 52 extend radially outward from the hollow pushpin 14. The disks 50, 52 may be employed to serve as an attachment feature for the trim panel 12, or an intermediate part, that secures the trim panel 12 to the hollow pushpin 14, and thereby the pin assembly 10. Although the hollow pushpin 14, as well as the disks 50, 52, have been described as having a circular cross-section, various other geometric cross-sections may be employed for any or all of these components. The hollow pushpin 14 is typically a molded plastic piece, however, alternative materials may be employed.

The hollow pushpin 14 includes a sealing disk 48 and extends radially outwardly from the hollow pushpin 14. The hollow pushpin 14 also includes at least one, but typically a plurality of flexible fins 20 that are located proximate the front end 16 of the hollow pushpin 14. The flexible fins 20 are flexibly hinged at point 54 to the hollow pushpin 14. A corresponding void 22 allows the flexible fins 20 to rotate or flex inwardly towards a longitudinal centerline 44 of the hollow pushpin 14. Each flexible fin 20 includes a first angled face 58 that extends from the point 54 where the flexible fin 20 is hingeably attached and runs toward the rear end 18 of the hollow pushpin 14, while also extending radially outward from the longitudinal centerline 44 of the hollow pushpin 14. The first angled face 58 terminates at point 56, and transitions to a second angled face 60. The second angled face 60 extends from the point 56 toward the rear end 18 of the hollow pushpin 14 and radially inward toward the longitudinal centerline 44 of the hollow pushpin 14. In the illustrated example, both the first and second angled faces 58, 60 comprise linear paths, however, the first and second angled faces 58, 60 may comprise a slightly curved geometry. The second angled face 60 terminates proximate the sealing disk 48 and it is this small space between the flexible fin 20 and the sealing face 48 that the inner panel 26 will reside between when the pin assembly 10 is fully inserted into an aperture of the inner panel 26.

The inertia pin 24 of the pin assembly 10 includes a first end 28, a second end 32, and is configured to reside substantially within the hollowed out portion of the hollow pushpin 14. The illustrated example shows the inertia pin 24 to have a circular cross-section, but as is the case with the hollow pushpin 14, any other geometric configuration may be employed. The first end 28 of the inertia pin 24 extends radially outwardly and towards the second end 32 of the inertia pin 24. A spring retaining face 62 is included and is aligned substantially perpendicular to the longitudinal centerline 44 of the hollow pushpin 14. The spring retaining face 62 extends inwardly and then transitions in a direction substantially parallel to the longitudinal centerline 44 of the hollow pushpin 14. This outer diameter of the inertia pin 24 substantially corresponds to the inner diameter of the hollow pushpin 14.

Extending from the spring retaining face 62 toward the second end 32 of the inertia pin 24 defines a plunger portion 36 of the inertia pin 24. The plunger portion 36 includes two main regions. The first region includes the portion immediately adjacent the spring retaining face 62 and maintains an outer diameter that corresponds substantially to the inner diameter of the hollow pushpin 14. At a location proximate the flexible fins 20, the plunger portion 36 begins to taper inwardly toward the longitudinal centerline 44, thereby gradually decreasing the outer perimeter of the inertia pin 24.

The inertia pin 24, moving toward the second end 32, then transitions to a neck portion 38 that maintains a relatively constant outer diameter, thereby increasing the void 22 upon which the flexible fins 20 may be accommodated during flexure. The remainder of the inertia pin 24, moving toward the second end 32 consists of a shaft portion 34 that maintains a constant outer diameter relatively similar to the inner diameter of the hollow pushpin 14. Immediately proximate the second end 32 of the inertia pin 24, a screw or snapping feature securely attaches a weight 46 to the inertia pin 24. The weight 46 is typically a metal, but any material may be employed that is suitable for this application.

Figure 4:
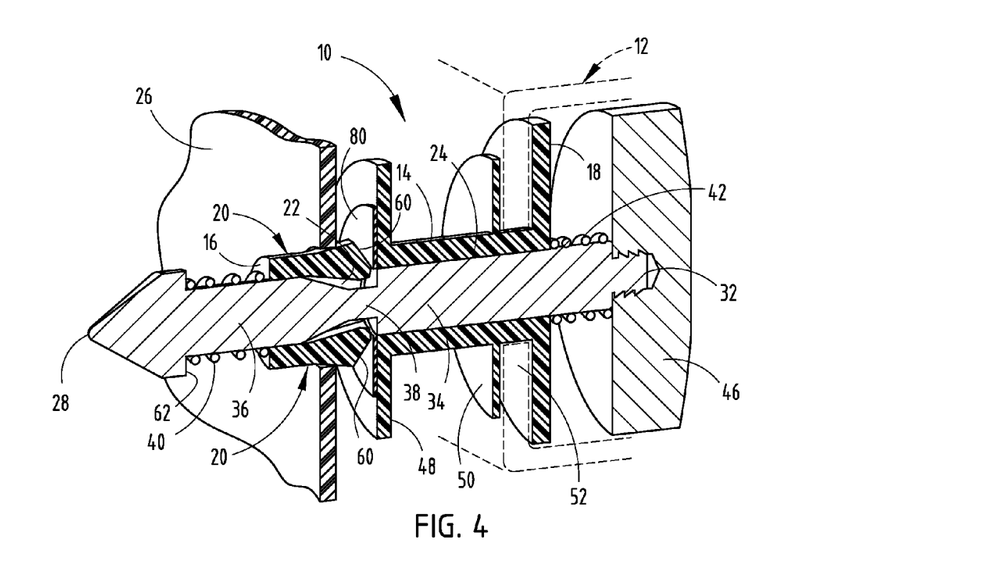
FIG. 4 is a front, perspective cross-sectional view of the pin assembly partially inserted into the aperture of the inner panel.
Figure 5:
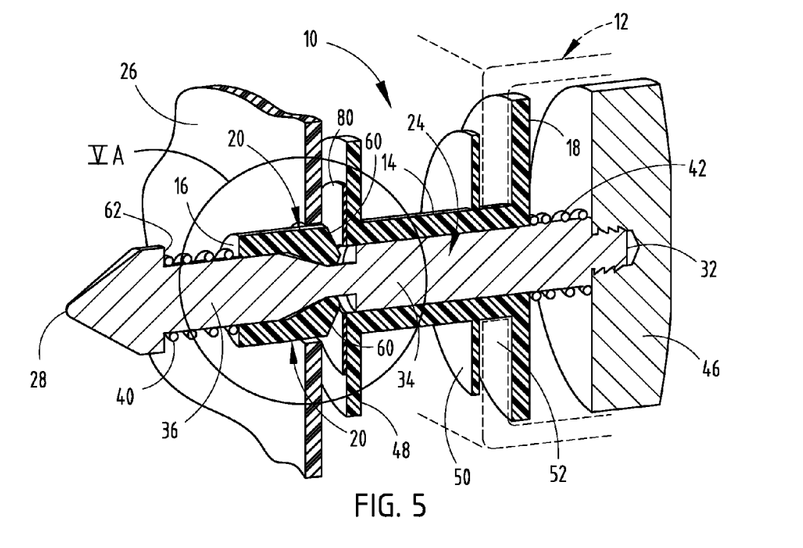
FIG. 5 is an enlarged view of the pin assembly partially inserted into the aperture of the inner panel.
Figure 5A:
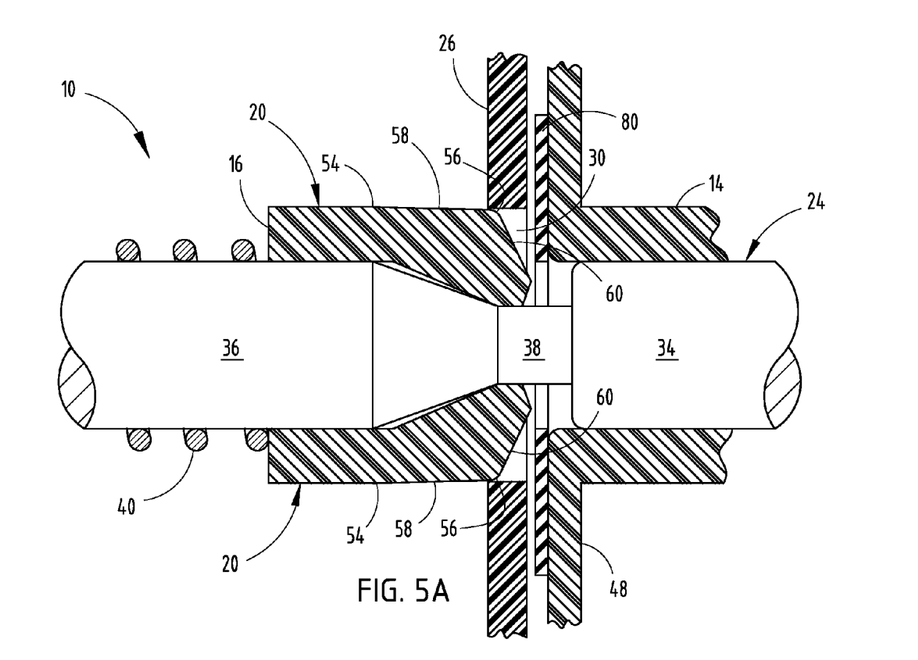
FIG. 5A is a front, perspective cross-sectional view of the pin assembly partially inserted into the aperture of the inner panel.

FIGS. 4-5A illustrate a partial insertion of the pin assembly 10 into the inner panel 26. After initially penetrating the aperture 30 of the inner panel 26, the flexible fins 20 eventually engage the inner panel 26. Specifically, the outer perimeter of the aperture 30 of the inner panel 26 engages the first angled face 58 of the flexible fin 20, thereby depressing each fin 20 into the corresponding void 22 by rotating each fin 20 about hinge point 54. Further insertion of the pin assembly 10 continues the process of the inner panel 26 gliding along the first angled face 58 of the flexible fin 20 until the flexible fin 20 bypasses the aperture 30 of the inner panel 26. Full insertion of the pin assembly 10 is reached when the sealing disk 48, which includes a seal 80, engages the inner panel 26, as well as when the flexible fins 20 rotate outwardly away from the longitudinal centerline 44. The outward flexing of the fins 20 occurs due to a biasing force that is applied proximate hinge point 54.

Figure 6:
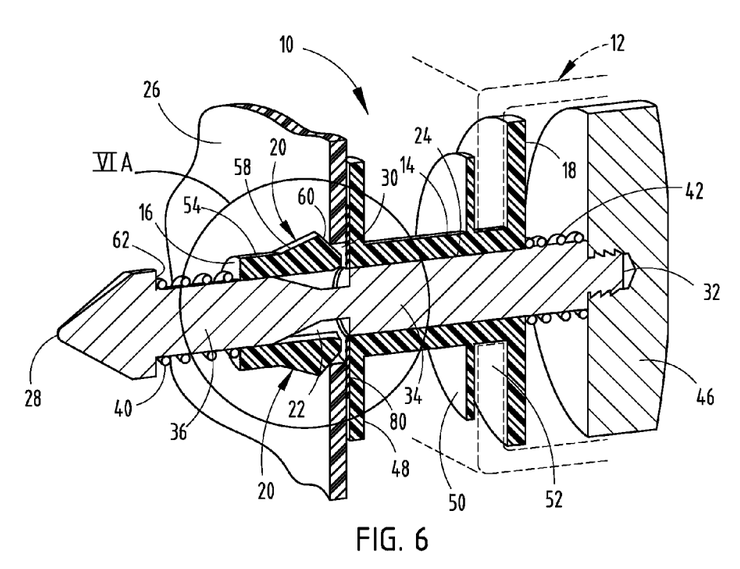
FIG. 6 is a front, perspective cross-sectional view of the pin assembly fully inserted into the aperture of the inner panel.
Figure 6A:
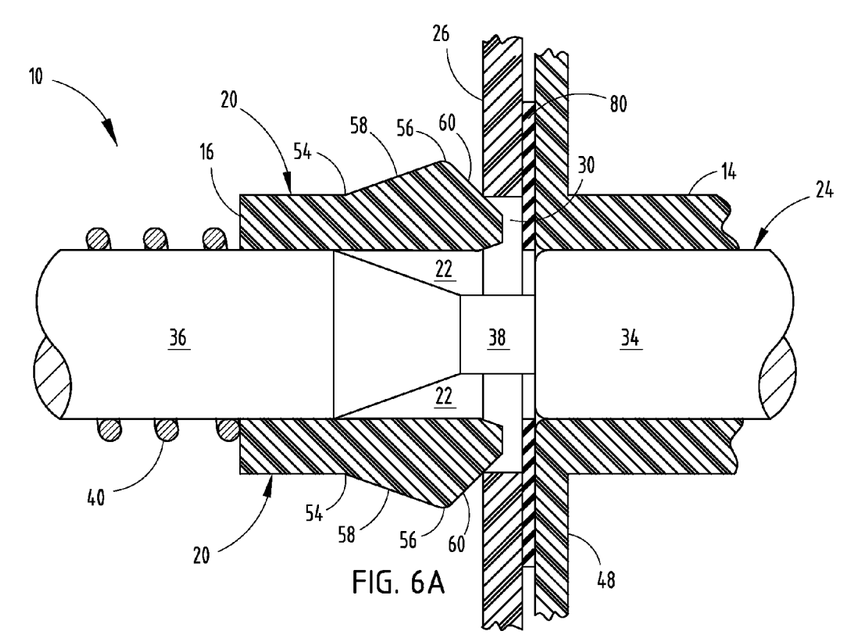
FIG. 6A is an enlarged view of the pin assembly fully inserted into the aperture of the inner panel.

In the position where the pin assembly 10 is fully inserted into the inner panel 26 (FIGS. 6 and 6A), the inner panel is engaged, or very nearly in contact with, the second angled face 60 of the flexible fin 20. In this fully inserted position, the trim panel 12 is securely engaged to the inner panel 26 and this constitutes a static position. From this static position, the trim panel 12 may optionally be removed from the inner panel 26 for service or replacement. To accomplish removal, sufficient force must be applied to withdraw the pin assembly 10, specifically overcoming the hinge force of the flexible fins 20. Sufficient pulling force will cause the inner panel 26 to slide along the second angled face 60, thereby depressing each fin 20 into the corresponding void 22 until the pin assembly 10 may be fully withdrawn.

Figure 7:
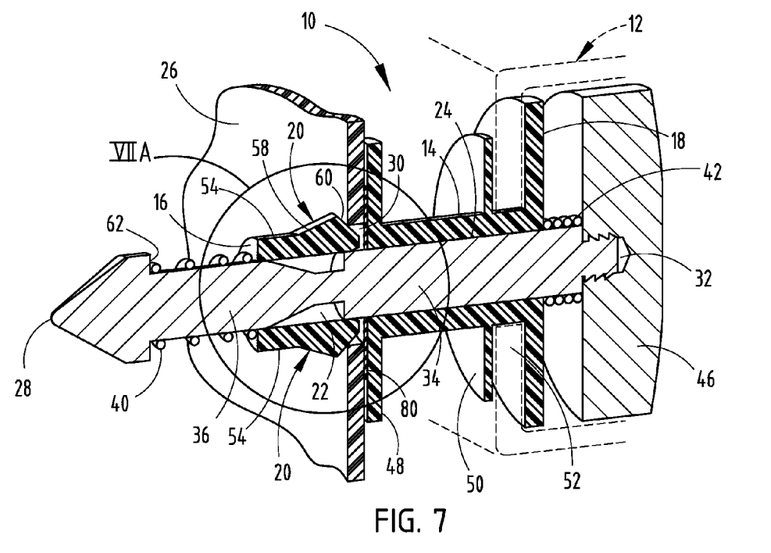
FIG. 7 is a front, perspective cross-sectional view of the pin assembly in a first impact position.
Figure 7A:
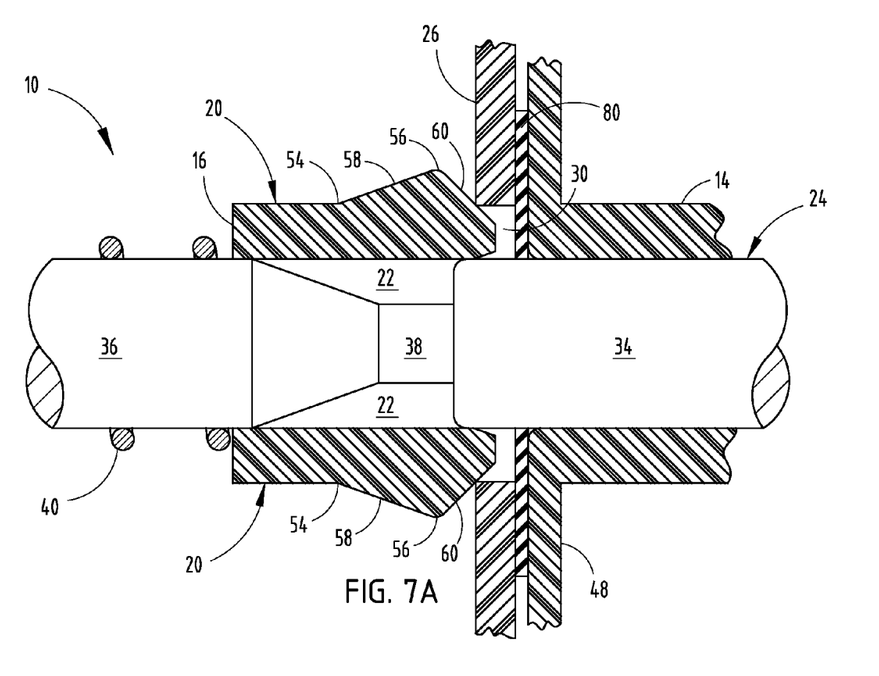
FIG. 7A is an enlarged view of a front, perspective cross-sectional view of the pin assembly in a first impact position.

To avoid withdrawal of the pin assembly 10, and thereby the trim panel 12, when undergoing a significant external force such as an automobile collision, the pin assembly 10 is capable of transitioning to an impact position (FIGS. 7 and 7A). In the illustrated example, a first spring 40 is disposed between the spring retaining face 62 of the inertia pin 24 and the front end 16 of the hollow pushpin 14. Additionally, a second spring 42 is disposed between the rear end 18 of the hollow pushpin 14 and the weight 46. The springs 40, 42 constrain the relative motion of the inertia pin 24 within the hollow pushpin 14 and allow such movement only in the event of an introduction of a force sufficient to overcome the spring force. As illustrated, when such a force F is introduced, the inertia pin 24 slides within the hollow pushpin 14 causing either the shaft portion 34 or the plunger portion 36 to move into the void 22 where the flexible fin 20 is capable of rotating. By blocking the ability of the fins 20 to rotate, the overall pin assembly 10 is effectively locked in place, thereby preventing the pin assembly 10 and trim panel 12 from disengaging the inner panel 26.

The two springs are equal in spring force, thus keeping the movable inertia pin 24 centered in a neutral position where it can be inserted into and extracted out of the aperture 30 in the inner panel 26 with lower forces without permanent damage to the pushpin 14. In a side impact from either side of the vehicle, the suspended inertia pin 24 will resist movement while the pushpin 14, which is attached to the inner panel 26 and trim panel 12, will move with the external force. This will result in one of the springs 40, 42 to compress and the other spring 40, 42 to expand as the inertia pin 24 resists the movement caused by the side impact (this description is relative to the inertia pin 24, as in actuality, an automobile and all its components will be moving and as the automobile comes to a stop in a side impact, the inertia pin 24 will attempt to maintain its velocity).

Figure 8:
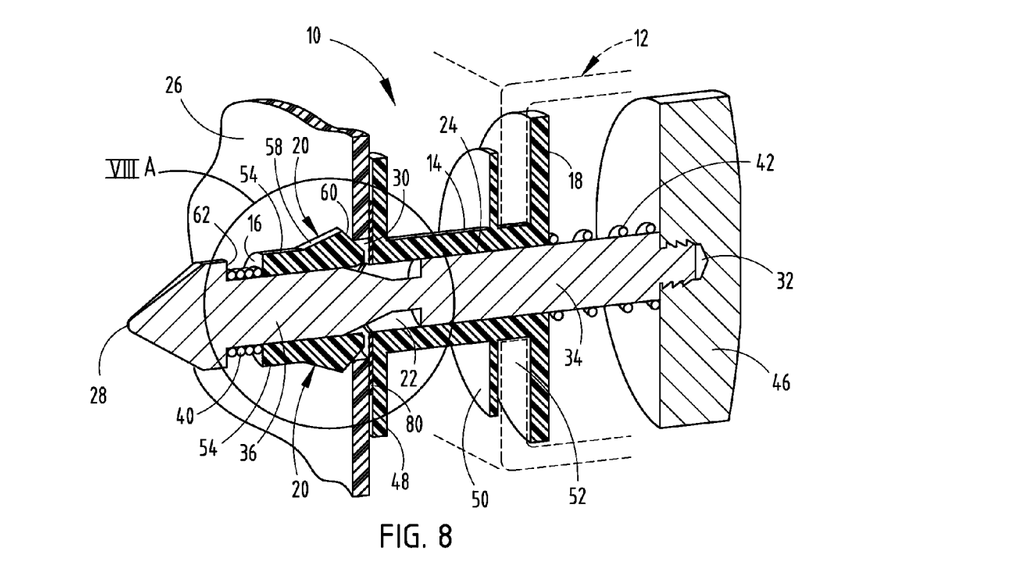
FIG. 8 is a front, perspective cross-sectional view of the pin assembly in a second impact position.
Figure 8A:
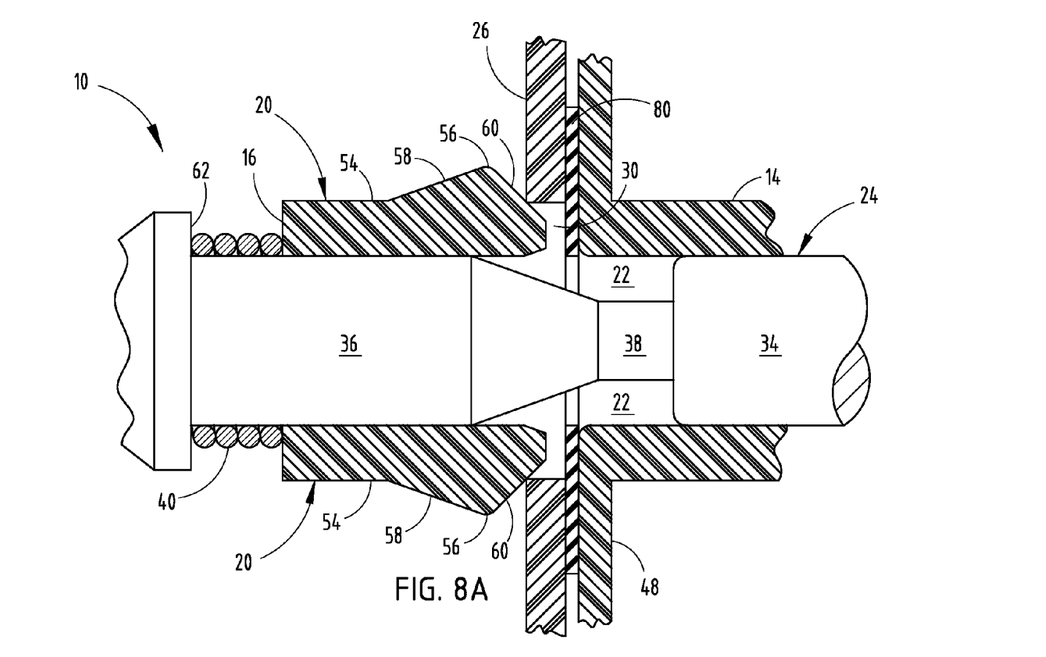
FIG. 8A is an enlarged view of a front, perspective cross-sectional view of the pin assembly in a second impact position.

FIGS. 7 and 7A illustrate a pin assembly 10 having two springs 40, 42 and thereby a bidirectional assembly. FIGS. 8 and 8A illustrate operation of the pin assembly 10 upon the introduction of a force in the opposite direction. It is also conceivable that a unidirectional assembly may be employed by simply having one spring in one of the two positions shown.

Figure 9:
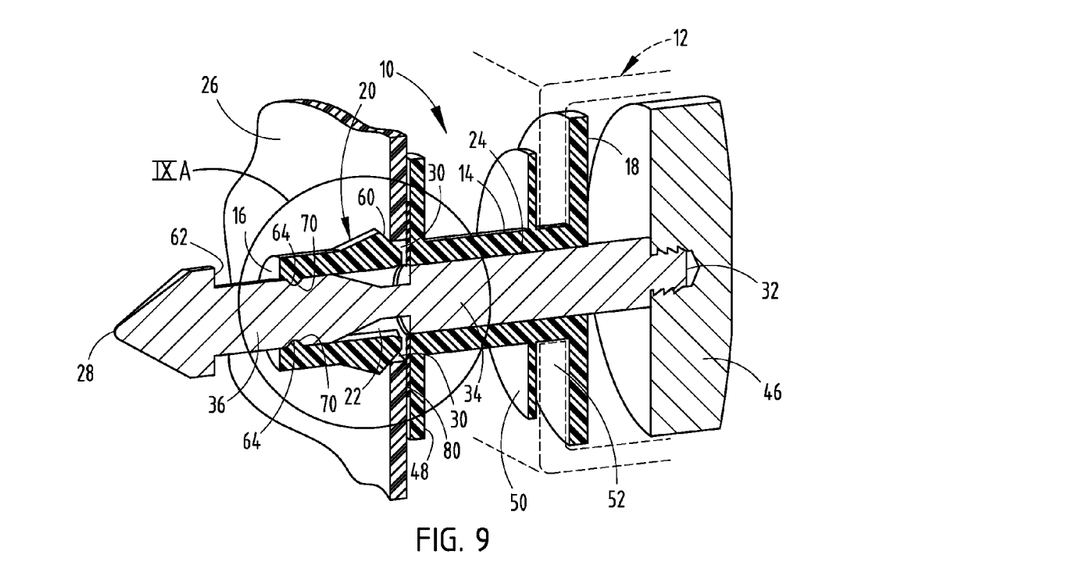
FIG. 9 is a front, perspective cross-sectional view of a second embodiment of the pin assembly for retaining a trim panel to an inner panel.
Figure 9A:
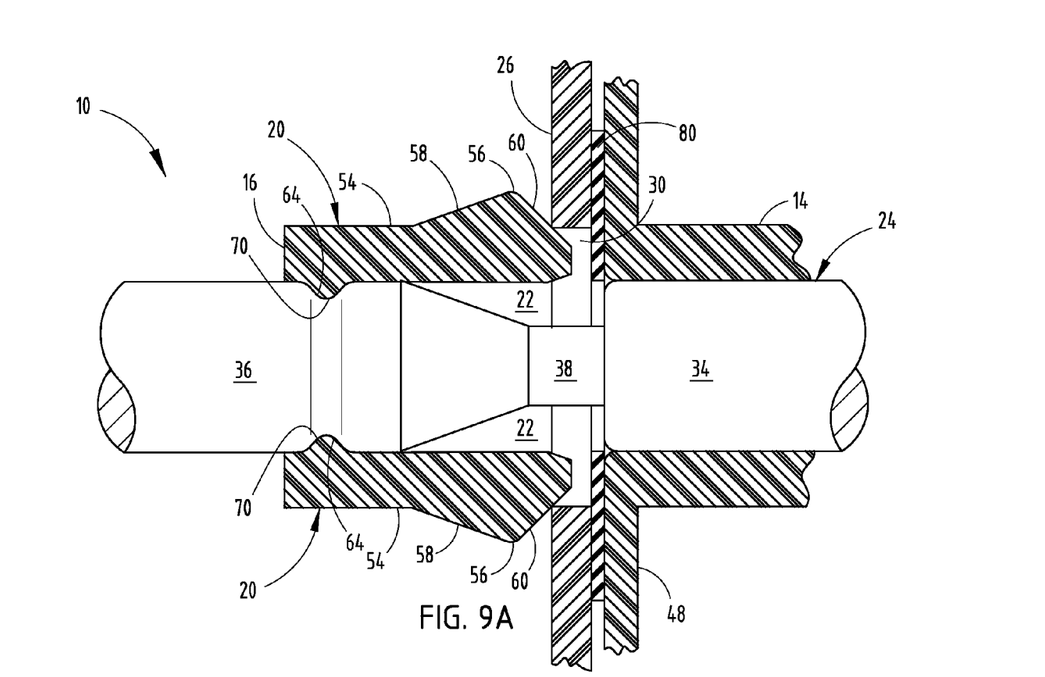
FIG. 9A is an enlarged view of a front, perspective cross-sectional view of a second embodiment of the pin assembly for retaining a trim panel to an inner panel.

An alternative embodiment (FIGS. 9 and 9A) alleviates the use of springs. The pin assembly 10 of this embodiment is similar to the previously described embodiment, but rather than employing the springs to constrain the relative motion of the inertia pin 24 to the hollow pushpin 14, a ring 70 within the inner diameter of the hollow pushpin 14 protrudes into a recess 64 of the inertia pin 24. The ring 70 matably engages the recess 64, thereby providing a retaining force. Similar to the spring embodiment, introduction of an external force sufficient to overcome the retaining force of the ring-recess arrangement 70, 64 results in the inertia pin 24 sliding within the hollow pushpin 14 into a position that prevents the flexible fins 20 from flexing into the void 22.

The pin assembly 10 is a single, self-contained assembly that provides a simple handling and assembly operation for a user during installation and/or service.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle pin assembly and inner panel for retaining a trim panel to the inner panel, comprising:
    a hollow pushpin having an inner channel, an attachment feature for engaging the trim panel, and a fin protruding outward to engage the inner panel;
    a first spring located proximate a front end of the hollow pushpin;
    a second spring located proximate a rear end of the hollow pushpin; and
    an inertia pin slidably disposed within the inner channel and having a side surface with a void, wherein the first and second springs are coupled with opposing ends of the inertia pin to bias the inertia pin in a static position that aligns the void with the fin for allowing the fin to flex inward into the void to disengage from the inner panel, wherein the inertia pin is slidable in a first direction within the inner channel to move from the static position to a first impact position that compresses the first spring and slidable in a second opposing direction to move from the static position to a second impact position that compresses the second spring, and wherein the first and second impact positions misalign the void with the outward protruding fin, such that the side surface prevents the outward protruding fin from flexing inward to disengage from the inner panel.

2. The vehicle pin assembly and inner panel of claim 1, wherein the inertia pin has a cylindrical shape and the fin is configured to flex radially inward into the void in the inertia pin.

3. The vehicle pin assembly and inner panel of claim 2, wherein the first and second impact positions prevent the trim panel from disengaging from the inner panel.

4. The vehicle pin assembly and inner panel of claim 3, wherein a first end of the inertia pin slides away from the front end of the hollow pushpin when the inertia pin slides to the second impact position, and wherein the first end slides toward the front end when the inertia pin slides to the first impact position.

5. The vehicle pin assembly and inner panel of claim 4, wherein the void in the inertia pin is defined by a neck portion of the inertia pin that is located between a shaft portion and a plunger portion of the inertia pin.

6. The vehicle pin assembly and inner panel of claim 5, wherein the neck portion is substantially aligned with the fin when the inertia pin is in the static position, and wherein the shaft portion and the plunger portion of the inertia pin each include an outer diameter substantially similar to an inner diameter of the hollow pushpin.

7. The vehicle pin assembly and inner panel of claim 6, wherein the plunger portion or the shaft portion is substantially aligned with the fin when the inertia pin is in the respective first or second impact position, thereby preventing the fin from flexing radially inward.

8. The vehicle pin assembly and inner panel of claim 7, wherein the fin comprises a first angled face and a second angled face, wherein the first angled face is configured to slide along an aperture in the inner panel during engagement of the hollow pushpin with the inner panel and the second angled face abuts the aperture to retain the hollow pushpin to the inner panel.

9. The vehicle pin assembly and inner panel of claim 1, wherein the first spring is disposed between the front end of the hollow pushpin and a first retention face on a first end of the inertia pin and the second spring is disposed between the rear end of the hollow pushpin and a second retention face on a second end of the inertia pin.

10. A vehicle pin assembly and panel for retaining a trim piece to the panel, comprising:
    a pushpin having an inner channel and a fin protruding outward and engaging the panel;
    an inertia pin slidably disposed within the inner channel and having a void that aligns with the fin in a static position, allowing the fin to flex inward and disengage the panel; and
    a spring coupled between an end of the pushpin and an end of the inertia pin that compresses and stretches when the inertia pins slides in respective first and second opposing directions out of the static position, misaligning the void with the fin and preventing the fin from flexing inward into the void.

11. The vehicle pin assembly and panel of claim 10, wherein the vehicle pin assembly and panel are configured for a lateral inertial force on the vehicle pin assembly and the panel to cause the inertia pin to move relative to the pushpin out of the static position to an impact position defined by the void misaligned with the fin.

12. The vehicle pin assembly and panel of claim 11, wherein the inertia pin has a cylindrical shape and the fin is configured to flex radially inward into the void, and wherein the inertia pin in the impact position prevents the fin from flexing radially inward.

13. The vehicle pin assembly and panel of claim 12, wherein the inertia pin includes a neck portion that defines the void and is substantially aligned with the fin to define the static position.

14. The vehicle pin assembly and panel of claim 12, wherein the inertia pin includes a plunger portion and a shaft portion on opposing sides of the void each having a diameter substantially equivalent to the inner channel of the pushpin, and wherein the plunger portion or the shaft portion is substantially aligned with the fin when the inertia pin is in the impact position, thereby preventing the fin from flexing radially inward.

15. The vehicle pin assembly and panel of claim 12, wherein the fin comprises a first angled face and a second opposing angled face, wherein the first angled face is configured to slidably engage the panel during insertion of the pushpin into the panel.

16. The vehicle pin assembly and panel of claim 15, wherein the second opposing angled face of the fin is configured to engage the panel while the inertia pin is in the impact position.

17. A pin assembly and inner panel for retaining a trim panel to the inner panel, comprising:
  a pushpin having a hollow inner portion and a flexible member that engages the inner panel and flexes into the hollow inner portion to disengage from the inner panel;
  an inertia pin slidably disposed within the hollow inner portion of the pushpin, wherein the inertia pin includes a void that aligns with the flexible member when the inertia pin is in a static position to allow the flexible member to flex into the hollow inner portion; and
  a spring coupled between the pushpin and the inertia pin that biases the inertia pin in the static position, wherein the spring compresses to slide the inertia pin relative to the pushpin in a first direction from the static position to a first impact position and the spring stretches to slide the inertia pin relative to the pushpin in a second opposing direction from the static position to a second impact position, wherein the first and second impact positions misalign the void with the flexible member to prevent the flexible member from flexing into the hollow inner portion.

18. The pin assembly and inner panel of claim 17, wherein the inertia pin includes a plunger portion and a shaft portion on opposing sides of the void, and wherein the plunger portion or the shaft portion is substantially aligned with the flexible member when the inertia pin is in the first and second impact positions, thereby preventing the flexible member from flexing inward.

19. The pin assembly and inner panel of claim 17, wherein the flexible member comprises a first angled face and a second angled face, wherein the first angled face is configured to slidably engage the inner panel during insertion of the inertia pin into an aperture in the inner panel.

20. The pin assembly and inner panel of claim 19, wherein the second angled face of the flexible member is configured to engage the inner panel.

* * * * *